Patented Jan. 10, 1928.

1,655,707

UNITED STATES PATENT OFFICE.

HENRY A. KOHMAN, OF PITTSBURGH, PENNSYLVANIA.

MANUFACTURE OF BREAD.

No Drawing.     Application filed December 12, 1924.  Serial No. 755,564.

This invention relates to improvements in the manufacture of leavened bread, and has as a general object the production of a loaf of improved quality in a convenient and economical manner.

A more specific object of the invention is to provide a process of bread manufacture in which the fermentation period or "dough time" may be substantially completely eliminated without adversely affecting the quality of the bread.

A further object of the invention is to provide a process wherein the so-called "soft" or "weak" flours commonly known as "pastry" flours may be used alone, or in combination with but a small quantity of "strong" flour, to produce a commercial bread of the best quality, with minimum variation of the process to compensate for the different conditions of temperature, humidity, etc., which so vitally affect the product of the heretofore known baking processes.

In the heretofore usual commercial processes, the ingredients making up the dough batch, necessarily flour, water, salt and yeast and usually also milk, sugar and shortening, are mixed together into a dough, which dough must be allowed to stand before dividing into loaves for a period of several hours in order for the gluten to "age" or "ripen" so that the gas generated by the yeast fermentation will be retained by the dough when the loaf is placed in the oven. This period of fermentation or "dough time" occupies from 2½ to 6 or 7 hours, depending upon the quantity of yeast employed and the quality and character of the bread it is desired to produce. Not only do the dough troughs in which the dough stands require a large space—in practice about half the space required for the total baking operations—but also the temperature and humidity of the air must be carefully regulated during this period to insure the proper fermentation.

These difficulties have led to the adoption to some extent of quick processes for making bread wherein by the use of an increased quantity of yeast and high temperatures, the fermenting time is materially lessened or eliminated altogether. Such processes have not, however, been used by some bakers except as an emergency measure when an extra quantity of bread must be gotten out in the minimum of time, for the reason that the resulting loaf, while acceptable and salable as a commercial loaf of bread, is not, in their opinion, uniformly of as good quality and loaf volume as can be produced with the same ingredients by the ordinary process involving a fermentation period of reasonable length. The reason for this is probably that the action of the yeast on the gluten requires an appreciable time regardless of the quantity of yeast and the temperature employed. Consequently the bread produced by the so-called "no time dough" processes is not uniformly so light and well risen as bread made from the same ingredients by the ordinary methods. This difference is most apparent in the relative size of the loaves. For instance, loaves made from dough scaled to 500 grams per loaf will, by the usual processes of manufacture, have a volume of 2000 cc. or over, whereas loaves produced from the same quantity of a so-called "no-time dough" will average only somewhat more than about 1700 cc. per loaf.

By my improved process of manufacture I can produce loaves of 2200 cc. and over from 500 grams of dough, and without any more fermentation period than the so-called "no-time doughs" now made with the use of a large quantity of yeast and higher fermentation temperatures.

The greater portion of the wheat raised in this country, particularly the wheat grown east of the Mississippi and the Pacific coast wheats, produce weak flours, and in order to utilize such flours in the manufacture of bread, it has been heretofore customary to blend with such flours an equal quantity of strong flours of the type grown in the northwest or Kansas. By my improved process an excellent quality of bread can be made from flours milled from Pacific coast wheats and similar weak flours alone without any admixture of northwest or Kansas flours, and even the weakest of pastry flours can be used in my improved process when blended with an equal quantity of strong flour.

My invention resides particularly in employing in connection with the other ingredients of the dough batch which may be in accordance with any modern approved formula, a dough-maturing agent of the kind hereinafter specified in quantities far in excess of the quantities permissible in connection with bread-making processes involving a prolonged fermentation period, and in mixing the dough more thoroughly than necessary in ordinary time-dough baking practice. That is to say, in the ordinary process of bread-making in which the doughs are set aside for a fermentation period of two or more hours the period of mixing beyond that necessary to thoroughly commingle the ingredients has but little effect on the ultimate product. By my improved process, however, when the dough is not subjected to the action of the mixer for a period longer than required to mix the ingredients, it will tend to be "short" and will not produce a satisfactory loaf of bread. While the period of mixing may be varied somewhat in my improved process, depending, of course, on the character and speed of the mixer and the dough-maturing agent used, it is desirable when comparatively hard wheats are used, to continue the mixing for a period of 20–30 minutes. With softer wheats, the period may be shortened, but in any case the period of mixing should be long enough to make the dough tough and elastic.

The dough maturing agents which I have found particularly applicable to my present process are the persulphates, bromates, iodates and periodates, particularly the potassium or sodium salts. These salts are not, however, entire equivalents, as some of them produce more advantageous results when used with strong flours, while some give their optimum result with weaker flours. Also, the salts must be used in widely varying proportions having no apparent relation to their chemical formula or activity in other combinations. The quantities I have found to give the best results are as follows, the figures representing the quantities of the particular salt employed per 1000 grams of flour used in the dough batch:

|  | Grams. |
|---|---|
| Potassium persulfate | 1.0 to 2.5 |
| Potassium bromate | .2 to .3 |
| Potassium iodate | .015 to .025 |
| Potassium periodate | .01 to .015 |

In using these salts I find that the potassium persulfate and potassium bromate apparently produce the optimum result with soft flours, while the iodate and periodate apparently produce their optimum results with strong flours such as milled from Minnesota wheat. As stated above, the doughs made with strong flours preferably should be subjected to the action of the mixer until the dough smooths out as for example for about 20 minutes, while with the weaker flours the mixing period may be cut down to about 10 minutes. I also preferably employ somewhat higher temperatures in the mixer than in the usual standard bakery practice.

In making up a dough of 1000 grams of strong flour, I preferably employ 25 grams of yeast, .02 grams of potassium iodate, together with the other ingredients of the dough which may be in accordance with any approved formula. The several ingredients are placed in a power mixer which is maintained in operation for a period of substantially 20 minutes and at a temperature such that the dough will be at about from 26°–30° C. when the mixing is finished.

The dough is taken directly from the mixing machine to the dividing machine and is thereupon scaled off into loaves, molded, placed in the pans and proofed in the usual manner. When the dough is made up in accordance with the formula given above the loaves should be proofed about 50 minutes to one hour and at a temperature of about 40–45° C. After this period of proofing the loaves are placed in the oven and baked in the usual manner.

The resulting loaf will compare favorably with bread made in accordance with the usual methods. The loaf volume according to my improved method averages greater than the loaf volume made in accordance with the usual practice. Also, the "bloom" of the loaf will be equal to or better than the bloom of the loaf produced according to the ordinary method, even though only about one half as much sugar is employed in my improved loaf. The reason for this is that due to the short period of time that the yeast is active in the dough there is little opportunity for the fermentation of the sugar in the dough and the resulting loaf will have about as much sugar although the mix contains only 50% of the normal sugar. There is also an actual saving in the amount of flour consumed by the yeast in the leavening process, this saving amounting to as much as 1% of the total flour of the dough batch. That this conservation is obtained is obvious from the fact that the dough according to my improved process is not punched down, as is the case with doughs which are given a fermentation period in the dough trough. That is to say, according to my improved process the yeast is active in the dough for only a sufficient period to generate the necessary amount of gas to leaven the bread, and there is substantially none squeezed out and wasted as is the case when doughs are punched down in the usual manner.

In using weak flours I find that potassium persulfate and potassium bromate used in the quantity specified above per thousand grams of flour give a better result than can be had with the other salts mentioned. In fact, I have been able to obtain with weak flours, even pastry flours, without blending with strong flours, loaf volumes which compare favorably with the best loaf volumes obtainable with strong flours in the commercial baking of bread according to the usual practice. In utilizing such flours the only further change necessary from the procedure described above is to cut down the mixing period to about 10 minutes instead of 20 or 30 minutes as is preferable for strong flours.

The time given for the mixing period is based on the use of the present-day commercial "high speed" mixer which is the type of mixer used in practically all large baking establishments. When other types of mixers are employed the duration of the mixing operation will of course have to be correspondingly varied. My process is not recommended where the mixing is performed by hand, as it is difficult to work the dough sufficiently to get good results. Unless vigorously mixed, the dough "breaks" readily and produces bread with poor crust and of coarse, heavy texture.

As pointed out above, certain of the salts are better adapted for different flours than are other salts. I have found, however, that by mixing the salts in certain proportions I can secure a product which will give excellent results with flours of varying strength. For example, a mixture of potassium iodate and potassium persulfate in the proportion of .015 $KIO_3$ and .75 $K_2S_2O_8$ per thousand grams of flour produces practically uniform results with the various blends of flour which are customarily used for standard white wheat bread.

As a substitute for the above formula I have found a mixture of .015 $KIO_3$ and .08 $KBrO_3$ per thousand grams of flour to give substantially equivalent results.

The salts above mentioned, when used in the manner described, give the best results that I have been able to obtain in the practice of my improved process. It is to be understood, however, that my invention is not limited to the use of these salts, as other salts of like nature may be substituted for them. It will also be understood that my process may be otherwise varied in its details except insofar as specified in the accompanying claims.

What I claim as new and desire to secure by Letters Patent, is:—

1. In a process of manufacturing leavened bread in which the flour, yeast and other ingredients of the batch are mixed vigorously and the dough substantially immediately subdivided, proofed and baked, the improvement which comprises adding to the dough ingredients a mixture of dough maturing agents comprising an oxyhalogen acid compound and a persulphate.

2. In a process of manufacturing leavened bread in which the flour, yeast and other ingredients of the batch are mixed vigorously and the dough substantially immediately subdivided, proofed and baked, the improvement which comprises adding to the dough ingredients a mixture of dough maturing agents comprising an iodate and a persulphate.

3. In a process of manufacturing leavened bread in which the flour, yeast and other ingredients of the batch are mixed vigorously and the dough substantially immediately subdivided, proofed and baked, the improvement which comprises adding to the dough ingredients a mixture of dough maturing agents comprising about 0.0015% iodate and 0.075% persulphate based on the weight of flour used.

4. In a process of manufacturing leavened bread in which the flour, yeast and other ingredients of the batch are mixed vigorously and the dough substantially immediately subdivided, proofed and baked, the improvement which comprises adding to the dough ingredients, a dough maturing agent comprising at least 0.0015% iodate based on the weight of flour used.

5. In a process of manufacturing leavened bread in which the flour, yeast and other ingredients of the batch are mixed vigorously and the dough substantially immediately subdivided, proofed and baked, the improvement which comprises adding to the dough ingredients, a dough maturing agent comprising from 0.0015% to 0.0025% of potassium iodate based on the weight of flour used.

In testimony whereof I affix my signature.

HENRY A. KOHMAN.